United States Patent
Persson

[15] 3,663,851
[45] May 16, 1972

[54] D.C. MOTOR
[72] Inventor: Erland K. Persson, Minneapolis, Minn.
[73] Assignee: Electro-Craft Corporation, Hopkins, Minn.
[22] Filed: Sept. 21, 1970
[21] Appl. No.: 73,796

[52] U.S. Cl............................310/154, 310/177, 310/241, 310/257
[51] Int. Cl. ......................................................H02k 21/26
[58] Field of Search............310/154, 152, 155, 40, 40 MM, 310/46, 177, 241, 257, 254, 239

[56] References Cited

UNITED STATES PATENTS

| | | | |
|---|---|---|---|
| 3,277,324 | 10/1966 | Beaudoin | 310/254 |
| 2,901,645 | 8/1959 | Sulger | 310/257 |
| 1,927,176 | 9/1933 | Langley | 310/241 |

FOREIGN PATENTS OR APPLICATIONS

| | | | |
|---|---|---|---|
| 110,672 | 5/1964 | Czechoslovakia | 310/154 |
| 995,691 | 6/1965 | Great Britain | 310/154 |
| 1,054,555 | 4/1959 | Germany | 310/154 |
| 1,189,638 | 3/1965 | Germany | 310/154 |

Primary Examiner—J. D. Miller
Assistant Examiner—R. Skudy
Attorney—Carlsen, Carlsen & Sturm

[57] ABSTRACT

A d.c. motor having large, semicylindrical, chamfered pole pieces of soft magnetic material for focusing the magnetic flux of two permanent magnets onto the armature of the motor to provide an increased flux density, the armature has skewed slots and the edges of the pole pieces are skewed in opposition to the skewed slots to achieve the effect of a complete slot pitch skew in a short armature stack without having the loss of wire space normally associated with the severe skew angle previously utilized. The motor is mounted in an improved housing that has a removable brush cap attached to a retaining ring which is rotatable within a slot in the housing transverse to the axis of armature rotation to permit rotary adjustment of the brush cap.

10 Claims, 6 Drawing Figures

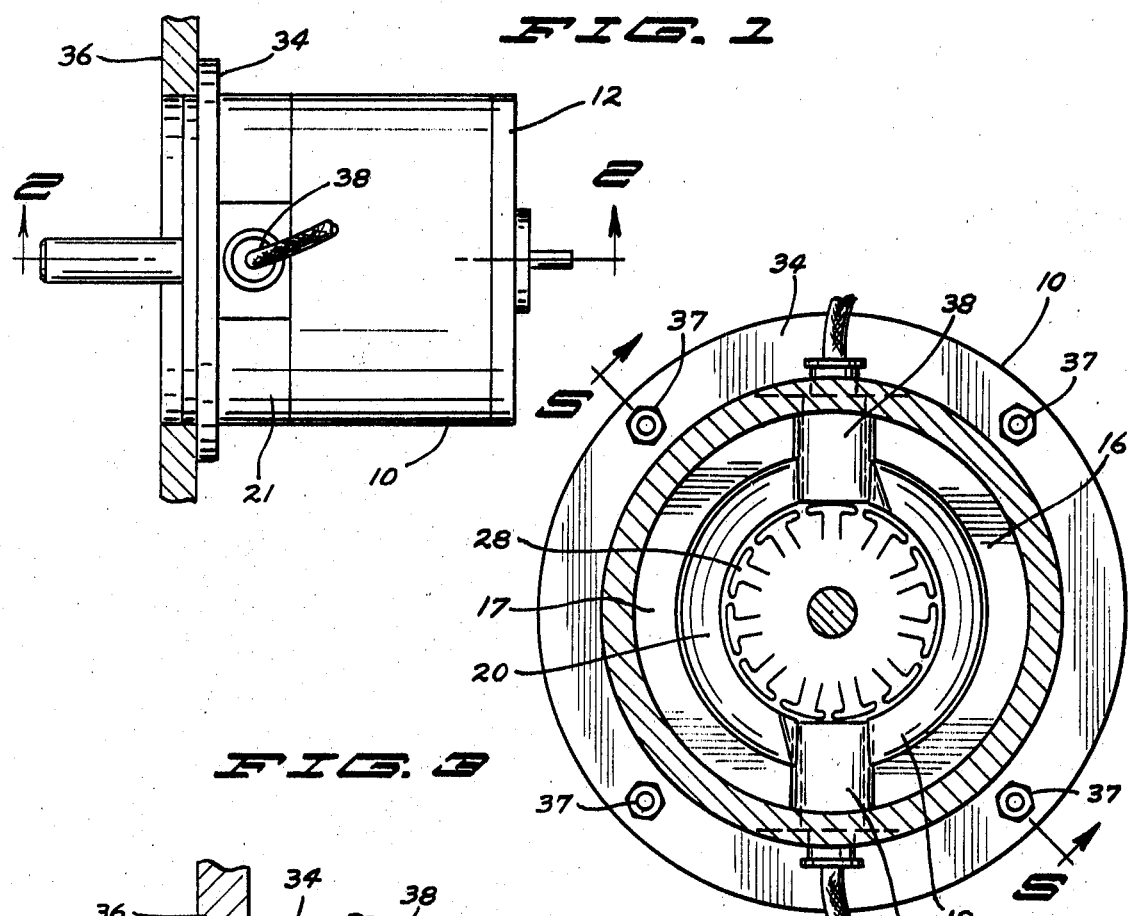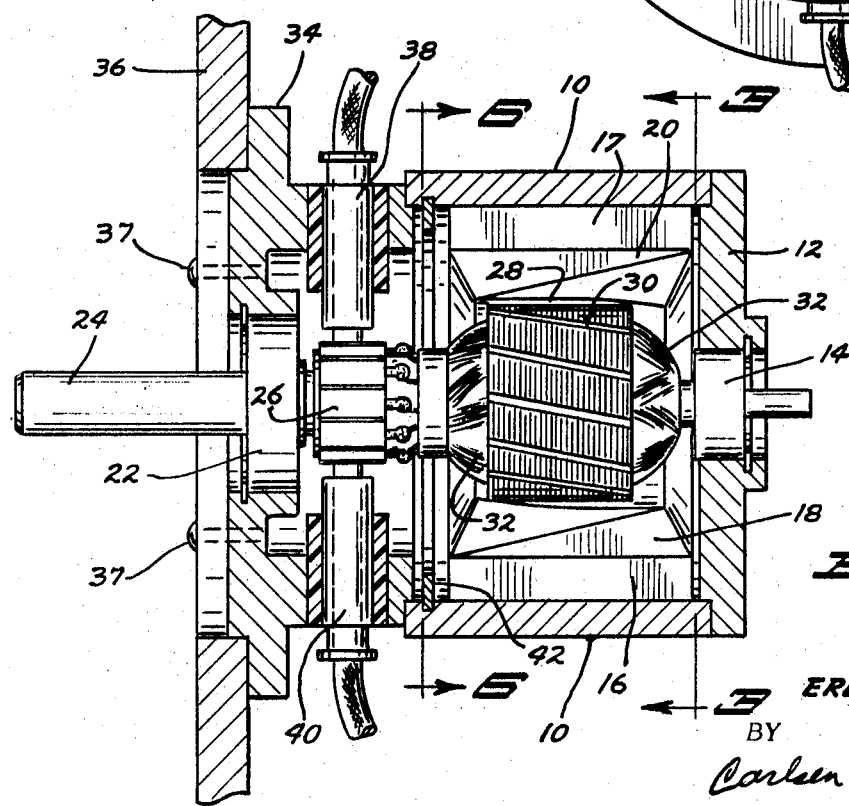

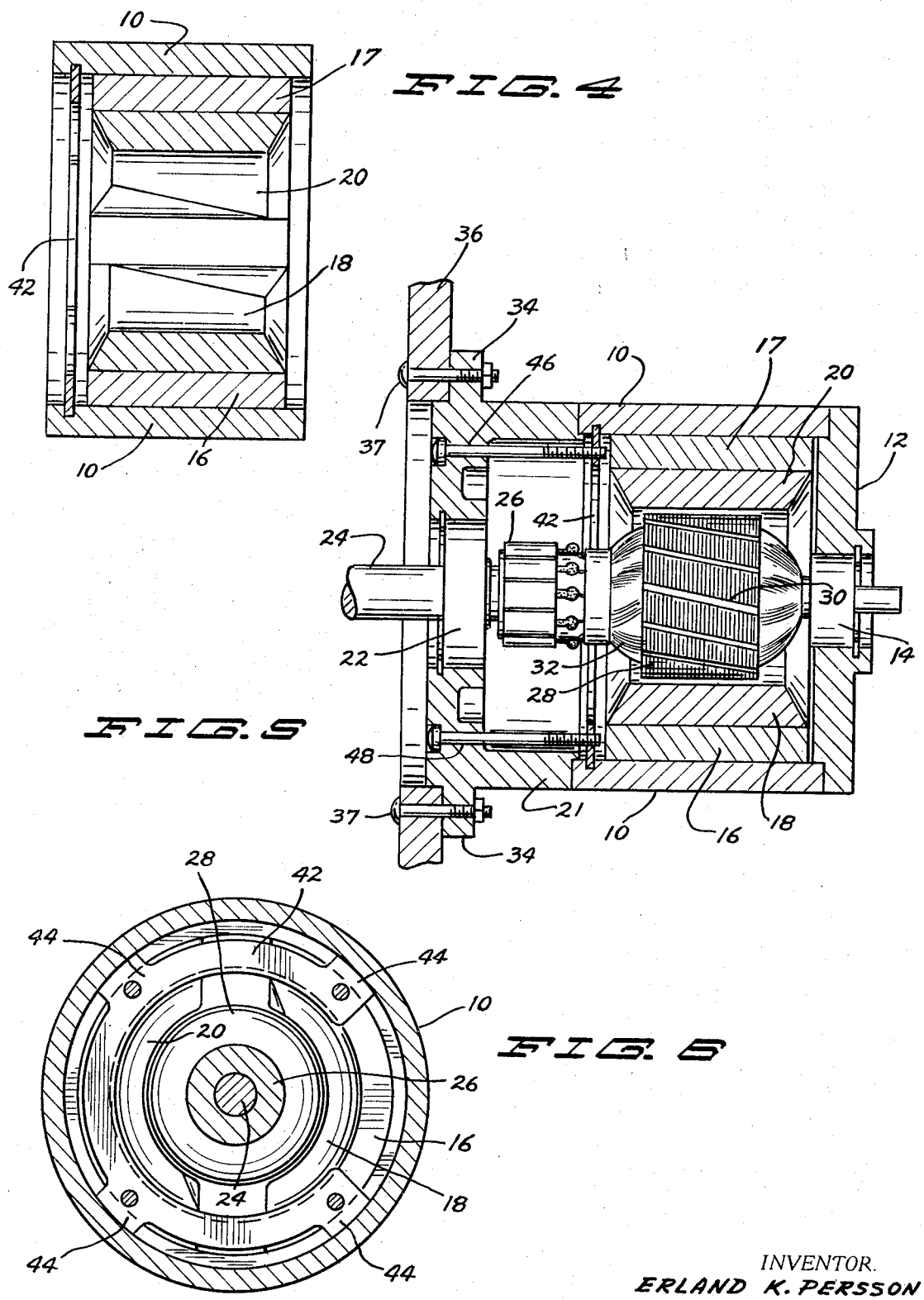

D.C. MOTOR

BACKGROUND OF THE INVENTION

This invention relates to rotary electromagnetic devices such as d.c. motors or the like. In recent years, the demand for miniaturized d.c. motors for computers and tape recorders has produced a need for increased efficiency, better transient response, and more compact packaging in such motors. With regard to increasing efficiency, one problem in the past has been the achievement of high flux densities between the field pole pieces and the armature, particularly in the case of small motors that utilize permanent magnet fields. With regard to transient response, another problem in the past has been pole tip demagnetization which occurs when large current pulses are passed through the armature. This problem is of special significance in incremental motion applications where one usually finds extremely high current pulses necessary to provide the required accelerations. Another problem arises due to skewing of the armature slots. The so-called slot lock effect (due to magnetic reluctance changes with shaft rotation) is normally minimized by skewing of the rotor slots one slot pitch. In the case of short armature stacks, which are typical in high performance, low inertia motors, such skewing causes a loss of usable space for magnet wire. With regard to compact packaging, another problem has been to provide a compact package that permits rotary alignment of the brushes and easy access to the brushes and commutator for maintenance purposes. This invention is addressed to all four of these problems and has for its object to provide a motor which has increased flux density between the field pole pieces and the armature, reduced pole tip demagnetization in response to large current pulses, minimum slot lock effect, maximum wire space, and a compact package that permits rotary alignment of the brushes and easy access to the brushes and commutator for maintenance purposes.

SUMMARY OF THE INVENTION

In accordance with this invention, increased flux density is achieved between the field pole pieces and the armature by means of a novel pole piece configuration which focuses the magnetic field in such a way as to reduce leakage flux. Relatively large pole pieces of soft magnetic material are used, the sides of the pole pieces being chamfered and the ends thereof being skewed in opposition to the skewed slots which are provided in the armature to prevent magnetic lockups when the armature coasts to a stop. By dividing the skew angle between the armature and the pole piece edges, minimum slot lock effect is achieved without significant loss of wire space. The large pole pieces distribute armature reaction flux over a large area of the magnets and thus diminish its demagnetizing influence on the pole tips. Easy access to the brushes and commutator is provided by means of a detachable brush cap which has substantially the same outside diameter as the motor housing.

The brush cap is secured to a rotatable retaining ring which is mounted in a slot formed in the inner surface of the housing transverse to the armature's axis of rotation. The rotatable ring allows the brush cap to be rotated for alignment purposes. Compactness of packaging is achieved by utilizing a cylindrical housing, semicylindrical field magnets, and semicylindrical pole pieces. The above-noted and other novel features of the invention will be described in detail below in connection with one specific embodiment of the invention as illustrated in the attached drawings.

BRIEF DESCRIPTION OF THE DRAWINGS

FIG. 1 is a side elevation view of one illustrative embodiment of the invention.

FIG. 2 is an axial cross sectional view taken along the plane 2—2 of FIG. 1.

FIG. 3 is a radial cross sectional view taken along the plane 3—3 of FIG. 2.

FIG. 4 is an axial cross sectional view of the motor housing, field magnet, and pole pieces by themselves showing the skewed edges of the pole pieces.

FIG. 5 is an axial cross sectional view taken along the plane 5—5 of FIG. 3.

FIG. 6 is a radial cross sectional view taken along the plane 6—6 of FIG. 2.

DETAILED DESCRIPTION OF THE INVENTION

Referring to FIGS. 1 through 3, one illustrative embodiment of the invention comprises a cylindrical housing member 10, a rear end plate 12 containing an armature shaft bearing 14, a pair of radially magnetized semicylindrical field magnets 16 and 17 mounted within housing member 10, two semicylindrical pole pieces 18 and 20 attached to the inner surface of corresponding field magnets 16 and 17, an armature/shaft/commutator assembly journaled on end plate 12 and housing 10 by bearing 14, and a brush cap assembly 21 which is attached to the other end of housing 10 and includes another armature shaft bearing 22.

The armature/shaft/commutator assembly includes a shaft 24, a commutator 26, an armature core 28 with skewed slots 30, and an armature winding 32 which is wound on core 28 in accordance with prior art techniques and coupled to commutator 26. The brush cap assembly 21 is cylindrical in shape and includes a flanged end plate 34 which is adapted to be attached to a supporting member 36 by means of bolts 37. The armature shaft bearing 22 and two brush holders 38 and 40 are mounted on brush cap assembly 21 in accordance with prior art techniques.

Brush cap assembly 21 is secured to housing member 10 by means of machine screws which extend through openings in the end of end plate 34 and engage a retaining ring 42 (best shown in FIG. 6) which is rotatably mounted in a groove cut in the inner surface of housing 10 transverse to the armature's axis of rotation. As shown in FIG. 6, retaining ring 42 is substantially "C" shaped and has a plurality of outwardly extending lugs 44 which engage the groove in housing 10. Retaining ring 42 is resilient and is inserted into its groove by being bent enough at the open portion of its "C" shape to admit the lugs 44 into the groove. Four threaded openings are provided in retaining ring 42 to receive machine screws which extend through corresponding openings in the end of end plate 34. FIG. 5 shows two of these machine screws 46 and 48 extending between end plate 34 and retaining ring 42 to hold the brush cap assembly 21 in place against housing member 10.

The above described retaining ring 42 is rotatable in its groove to permit rotary alignment of brush cap 21. After the brush cap is aligned, it is secured in place by tightening machine screws 46 and 48.

Pole pieces 18 and 20 are skewed at their ends in opposition to the skewed slots 30 in armature core 28 as best shown in FIG. 4, which is an axial cross sectional view of the interior of the motor housing with the armature removed. It will be understood by those skilled in the art that the skewed armature slots 30 are provided to prevent magnetic lockups (slot lock) when the armature coasts to a stop. In accordance with this invention, however, it has been found that skewing the edge of the pole piece in opposition to the skewed armature slot enhances the anti-lockup action if the sum of the slot skew angle and the pole piece skew angle equals the angle subtended by two adjacent armature slots. This angle is usually called one slot pitch. In short armature stacks, a skew of one slot pitch usually causes a reduction of usable copper area, and by minimizing the slot skew angle on the armature, the skewed pole pieces of this invention, counteract such reduction of usable copper area. This in turn means that more space is available in the armature for copper windings, which provides optimum efficiency and a reasonable balance between copper winding cross section and armature flux path cross section. The flux concentration at the pole tips is further increased by chamfering the sides of the pole pieces as best illustrated in FIGS. 4 and 5.

The above described field magnet/pole piece structure also minimizes pole tip demagnetization due to high current pulses by providing a large area for the distribution of armature reaction flux. This is particularly significant in applications where the motor is moved in incremental steps, which requires relatively large current surges. The relatively large area of the pole pieces also enhances the focusing effect and provides an increased flux density between the pole pieces and the armature.

Referring to FIG. 5, it will be apparent that this invention provides an unusually compact package by utilizing a cylindrical housing member 10, concentric semicylindrical field magnets 16 and 17, and concentric semicylindrical pole pieces 18 and 20. It will be equally apparent that rotatable retaining ring 42 provides a simple and inexpensive mounting for brush cap assembly 21 and that it permits easy adjustment and removal of the brush cap assembly for maintenance purposes.

Although this invention has been disclosed with reference to one specific embodiment thereof, it should be understood that the invention is not limited to the specific structure of the disclosed embodiment since many modifications can be made therein without departing from the basic principles of this invention. For example, although two pole pieces are used in the disclosed embodiment, it may be desirable to use four pole pieces in other embodiments. The ceramic field magnets can be replaced by metallic magnets if desired, and a different method of attaching the brush cap can be employed without changing the increased focus of magnetic flux provided by the skewed pole pieces of this invention. These and many other modifications of the disclosed structure will be apparent to those skilled in the art, and this invention includes all modifications falling within the scope of the following claims.

I claim:

1. A rotary electromagnetic device comprising a housing member, a slotted armature journaled for rotation within said housing member, the slots of said armature being skewed less than one slot pitch with respect to the rotary axis thereof, said armature having a small axial length to diameter ratio, a magnet having at least two opposing pole pieces mounted within said housing member adjacent to said armature for applying a magnetic field thereto, the axially extending edges of said pole pieces being similarly skewed in complementary opposition to the skewed slots of said armature for minimizing the slot lock effect and thereby reduce the skew angle required for the armature slots to less than one slot pitch, so as to increase the amount of space available on the armature for windings, an electrical winding attached to said armature for rotation therewith, and means for coupling electrical energy between said winding and said housing member.

2. The device of claim 1 in which said magnet comprises two semicylindrical permanent magnets made of ceramic ferro-magnetic material, said magnets being radially magnetized and mounted in opposing relationship within said housing member around said armature and at least two semicylindrical metallic pole pieces attached to the inner surface of said permanent magnets in opposing relationship for directing magnetic flux from said permanent magnets to said armature.

3. The device of claim 2 in which the sides of said metallic pole pieces are chamfered inwardly.

4. A rotary electromagnetic device comprising a housing member, an armature journaled for rotation within said housing member, an electrical winding and a commutator attached to said armature for rotation therewith, means coupling said winding to said commutator, means for applying a magnetic field to said armature for interaction with said electrical winding, a slot formed in the inner surface of said housing member transverse to the axis of rotation of said armature, a retaining ring rotatably mounted within said slot, a brush assembly for electrically engaging said commutator, and means for attaching said brush assembly to said retaining ring whereby said brush assembly can be rotated with respect to said housing for alignment purposes.

5. The device of claim 4 in which said armature is slotted, the slots thereof being skewed with respect to the axis of rotation thereof, and in which said means for applying a magnetic field to said armature comprises a permanent magnet having at least two opposing pole pieces mounted within said housing member adjacent to said armature for applying a magnetic field thereto, the edges of said pole pieces being skewed in opposition to the skewed slots of said armature for minimizing the slot lock effect and reducing the angle required for the armature slots, thereby increasing the amount of space available on the armature for windings.

6. The device of claim 5 in which said permanent magnet comprises two semicylindrical permanent magnets made of ceramic ferro-magnetic material, said magnets being radially magnetized and mounted in opposing relationship within said housing member around said armature, and at least two semicircular metallic pole pieces attached to the inner surface of said permanent magnets in opposing relationship for directing magnetic flux from said permanent magnets to said armature.

7. A magnetic focusing structure for use in combination with a rotary electromagnetic device including a housing member and an armature journaled for rotation within said housing member, said magnetic focusing structure comprising two semicylindrical permanent magnets mounted in opposing relationship within said housing member around said armature and two semicylindrical metallic pole pieces attached to the inner surface of said permanent magnets in opposing relationship for focusing the magnetic flux of said permanent magnets onto said armature, said magnets being relatively long in their axial dimension with respect to said armature, and the axial ends of said pole pieces being chamfered to focus the magnetic flux thereof into a smaller area, thereby increasing the flux density at the surface of the pole piece adjacent to said armature.

8. The magnetic focusing structure of claim 7 in which said permanent magnets are made of ceramic ferro-magnetic material and are radially magnetized.

9. The magnetic focusing structure of claim 7 in which said armature contains skewed slots of less than one pole pitch and in which the ends of said pole pieces are skewed in complementary opposition to the skewed slots in the armature for minimizing the slot lock effect and increasing the amount of space available on the armature for windings.

10. The magnetic focusing structure of claim 7 wherein said semicylindrical magnets and pole pieces substantially surround the entire surface area of said armature.

* * * * *